United States Patent Office 2,736,704
Patented Feb. 28, 1956

2,736,704

DETERGENT LUBRICATING OILS

Troy L. Cantrell, Drexel Hill, and Herschel G. Smith, Wallingford, Pa., assignors to Gulf Oil Corporation, Pittsburgh, Pa., a corporation of Pennsylvania No Drawing. Application April 5, 1954,
Serial No. 421,185

6 Claims. (Cl. 252—42.7)

This invention relates to mineral oil lubricant compositions containing detergent additives. As is known in the art, detergent additives are incorporated in mineral oil lubricant compositions to suspend or disperse deterioration products or contaminating materials developed during use of the lubricant, as well as to prevent ring sticking and the formation of engine deposits.

In accordance with our invention, we add to a mineral oil lubricant composition a minor amount, sufficient to confer detergency properties, of an alkaline earth metal salt of a condensation product of 6 mols of a monoalkylated monohydric phenol having at least four carbon atoms in the alkyl group, 2 mols of aniline, 1 mol of carbon disulfide and 8 mols of formaldehyde. These condensation products are excellent additives, and in addition to conferring detergency properties, act as bearing corrosion and rust inhibitors.

The condensation products of our invention are oil-soluble resinous materials incorporating in a unitary product alkaline earth metal, sulfur and nitrogen. They are prepared by forming a condensation reaction product of the phenol, aniline, formaldehyde and carbon disulfide in the proportions stated, an alkaline earth metal hydroxide, e. g., calcium, barium, magnesium or strontium hydroxide, being employed in the proportion of 3 mols to obtain the metal salts. Although in preparing the additives the reaction proceeds spontaneously at room temperature, it is preferred to employ moderately elevated temperatures, particularly in the last stages of reaction. As a final step, the temperature is raised to dehydrate the product, i. e., to distill off the water formed in the reaction and added with the reactants. A dehydration temperature of about 280° F. is suitable. It is advantageous to employ a naphtha or mineral lubricating oil as a reaction medium in order to obtain the final product in the form of a concentrated solution suitable for blending with various mineral oils.

The monohydric monoalkylated phenols employed as a reactant have at least four carbon atoms in the alkyl group. For example, such straight and branched chain alkyl groups as butyl, amyl, heptyl, octyl, nonyl, decyl, stearyl, cetyl and the long chain groups derived from paraffin wax are suitable. The alkyl groups containing from four to twelve carbon atoms form a preferred class. A preferred phenol is tetramethylbutyl phenol, obtained by the aklylation of phenol with diisobutylene in known manner.

The formaldehyde employed in the condensation reaction is most conveniently used in the form of commercial aqueous formalin, containing 37 percent by weight of formaldehyde. In performing the condensation reaction, it is convenient to disperse or dissolve the alkaline earth metal hydroxide either in water or in the aqueous formaldehyde solution.

The following example is illustrative of the preparation of one of the condensation products of this invention. Unless otherwise stated, all parts are by weight.

*Example I.*—Into a reaction vessel, there were charged 4944 parts of tetramethylbutyl phenol, 744 parts of aniline, 310 parts of carbon disulfide and 8800 parts of a mineral lubricating oil having a viscosity of about 155 S. U. S. at 100° F. The mixture was agitated for two hours at 260° F., then cooled to room temperature and added to a slurry of 888 parts of calcium hydroxide in 2720 parts of formalin. While agitating the mixture, the temperature was gradually raised to 280 °F. until all water has been distilled off and the product was dehydrated. Thereafter the solution obtained was filtered. The mineral oil solution of the resin thus prepared had the following properties:

| | |
|---|---|
| Gravity: °API | 19.4. |
| Viscosity, SUS: 210° F. | 103.0. |
| Color, ASTM Union | 4.75. |
| Sulfur, B: percent | 0.56. |
| Neutralization No. | 2.9 alkaline. |
| Ash as oxide: percent | 4.0. |

The metal, sulfur and nitrogen containing resinous condensation products of our invention are excellent addition agents. They are readily soluble in all types of mineral lubricating oils and can be blended with them in high proportions. They confer excellent detergent effects and rust inhibiting properties on the mineral lubricating oils in which they are incorporated, and are good bearing corrosion inhibitors. For these purposes, the condensation products are added to mineral oil lubricants in minor amounts, from about 0.1 to about 25 percent by weight, sufficient to confer improved detergency properties. Generally, the addition of about 1 to 2 percent by weight of the condensation products is sufficient to effect the desired improvement, but for heavy duty applications larger amounts are employed.

In order to illustrate the use of the condensation products of this invention in lubricating oils, a motor lubricating oil was blended with 3 percent by volume of the condensation product prepared according to Example I. Comparative inspections and tests of the identical untreated oil and the treated oil are as follows:

| | Untreated Oil | Treated Oil |
|---|---|---|
| Gravity, °API | 28.2 | 27.6. |
| Viscosity, SUS: | | |
| 100° F | 556 | 583. |
| 210° F | 66.4 | 68.1. |
| Viscosity Index | 97 | 97. |
| Flash, OC, °F | 480 | 490. |
| Fire, OC, °F | 555 | 540. |
| Pour, °F | −5 | −10. |
| Aging Test, 32° F., 24 Hrs | bright | bright. |
| Room Temp., 15 Days | do | Do. |
| Color, ASTM Union | 4.75 | 4.75. |
| Appearance | bright | bright. |
| Precipitation No | nil | nil. |
| Corrosion Test, ASTM D 665-46 T: | | |
| Distilled Water— | | |
| Steel Rod, Appearance | rust | bright. |
| Area Rusted, percent | 100 | 0. |
| Neutralization No | nil | nil. |
| Ash as Sulfate, percent | trace | 0.243. |
| Engine Test, CRC L-4: | | |
| Engine Condition Rating | failed to complete. | 89. |
| Bearing Loss, Mg./Whole Bearing | do | 15. |

As shown above, the condensation products of this invention confer effective detergency and bearing corrosion inhibiting properties. This is shown under the CRC L-4 test, the untreated oil failing to complete the test. The improvement in rust inhibiting properties is shown under the Corrosion Test.

While a mineral lubricating oil composition has been shown in the above example, the invention is not to be limited thereto but comprises all mineral oil lubricants to which the condensation products of this invention are added, such as greases and the like. As is known in the art, other additives in addition to the condensation products of our invention can also be employed. Such additives include pour point depressants, viscosity index improvers, antifoam agents, coloring agents, thickeners and the like.

We claim:

1. A lubricant composition comprising a major amount of a mineral lubricating oil and a minor amount, sufficient to confer detergency properties on the composition, of an alkaline earth metal salt of a condensation product prepared by the process which comprises reacting a mixture of about 6 mols of a monoalkylated monohydric phenol, about 2 mols of aniline and about 1 mol of carbon disulfide, cooling the resulting mixture to room temperature, and then adding said cooled mixture to an aqueous slurry of about 3 mols of an alkaline earth metal hydroxide and about 8 mols of formaldehyde, and raising the temperature sufficiently to distill off all water.

2. The composition of claim 1, wherein the monoalkylated phenol contains from 4 to 12 carbon atoms in the alkyl group.

3. The composition of claim 1, wherein the monoalkylated phenol is tetramethylbutyl phenol.

4. The composition of claim 1, wherein the metal salt is present in an amount of from about 0.1 to 25 percent by weight.

5. The composition of claim 1, wherein the alkaline earth metal is calcium.

6. A lubricant composition comprising a major amount of a mineral lubricating oil and a minor amount, sufficient to confer detergency properties on the composition, of an alkaline earth metal salt of a condensation product prepared by the process which comprises heating to about 260° F. a mixture of about 4944 parts of tetramethylbutyl phenol, about 744 parts of aniline and about 310 parts of carbon disulfide, cooling the resulting mixture to room temperature, then adding said mixture to a slurry of about 888 parts of calcium hydroxide in about 2720 parts of formalin and raising the temperature to 280° F. until all water has been distilled off.

References Cited in the file of this patent

UNITED STATES PATENTS

| | | |
|---|---|---|
| 2,497,099 | Smith et al. | Feb. 14, 1950 |
| 2,545,113 | Smith et al. | Mar. 13, 1951 |